US012811137B2

(12) United States Patent
Xu et al.

(10) Patent No.: US 12,811,137 B2
(45) Date of Patent: Nov. 24, 2026

(54) SINGLE-CORE MULTI-SHELL LITHIUM MANGANESE IRON PHOSPHATE CATHODE MATERIAL, PREPARATION METHOD, AND SECONDARY BATTERY

(71) Applicants: SHENZHEN DYNANONIC CO., LTD., Shenzhen (CN); FOSHAN DYNANONIC TECHNOLOGY CO., LTD., Foshan (CN); QUJING DYNANONIC CO., LTD., Qujing (CN)

(72) Inventors: Rongyi Xu, Shenzhen (CN); Yi Yang, Shenzhen (CN); Lingyong Kong, Shenzhen (CN); Yineng Li, Shenzhen (CN); Qifeng Liu, Shenzhen (CN)

(73) Assignees: SHENZHEN DYNANONIC CO., LTD., Shenzhen (CN); FOSHAN DYNANONIC TECHNOLOGY CO., LTD., Foshan (CN); QUJING DYNANONIC CO., LTD., Quijing (CN)

( * ) Notice: Subject to any disclaimer, the term of this patent is extended or adjusted under 35 U.S.C. 154(b) by 150 days.

(21) Appl. No.: 18/278,488

(22) PCT Filed: Mar. 22, 2023

(86) PCT No.: PCT/CN2023/083117
§ 371 (c)(1),
(2) Date: Aug. 23, 2023

(87) PCT Pub. No.: WO2023/185591
PCT Pub. Date: Oct. 5, 2023

(65) Prior Publication Data

US 2025/0054947 A1 Feb. 13, 2025

(30) Foreign Application Priority Data

Mar. 28, 2022 (CN) ........................ 202210309750.1

(51) Int. Cl.
*H01M 4/36* (2006.01)
*C01B 25/45* (2006.01)
(Continued)

(52) U.S. Cl.
CPC ............. *H01M 4/366* (2013.01); *C01B 25/45* (2013.01); *H01M 4/5825* (2013.01);
(Continued)

(58) Field of Classification Search
CPC .... H01M 4/366; H01M 4/5825; H01M 4/587; C01B 25/45; C01P 2004/62; C01P 2004/64; C01P 2004/80; C01P 2004/40
See application file for complete search history.

(56) References Cited

U.S. PATENT DOCUMENTS

2013/0337327 A1* 12/2013 Sun ........................ H01M 4/54 429/231
2014/0057164 A1 2/2014 Brambilla et al.
(Continued)

FOREIGN PATENT DOCUMENTS

CN 103515594 A * 1/2014 .............. H01M 4/58
CN 105810897 A 7/2016
(Continued)

OTHER PUBLICATIONS

EPO machine generated English translation of CN-103515594-A (Year: 2014).*

(Continued)

*Primary Examiner* — Kimberly Wyluda
(74) *Attorney, Agent, or Firm* — Brooks Kushman P. C.

(57) ABSTRACT

A single-core multi-shell lithium manganese iron phosphate cathode material and a preparation method thereof, and a secondary battery are disclosed. The composite material includes: a carbon-coated lithium iron phosphate core, and lithium manganese iron phosphate cladding layers cladded
(Continued)

on an outer surface of the carbon-coated lithium iron phosphate core. Each of the lithium manganese iron phosphate cladding layers includes lithium manganese iron phosphate particles and a carbon material coated on the lithium manganese iron phosphate particles. The lithium manganese iron phosphate particles in the lithium manganese iron phosphate cladding layers have particle sizes increasing in a radial direction from an inside to an outside of the single-core multi-shell lithium manganese iron phosphate composite material.

20 Claims, 2 Drawing Sheets

(51) Int. Cl.
*H01M 4/58* (2010.01)
*H01M 4/587* (2010.01)

(52) U.S. Cl.
CPC ......... *H01M 4/587* (2013.01); *C01P 2004/62* (2013.01); *C01P 2004/64* (2013.01); *C01P 2004/80* (2013.01); *C01P 2006/40* (2013.01)

(56) References Cited

U.S. PATENT DOCUMENTS

| | | | | |
|---|---|---|---|---|
| 2014/0158932 | A1* | 6/2014 | Sun | H01M 4/13 252/182.1 |
| 2016/0315316 | A1 | 10/2016 | Yoshida et al. | |
| 2024/0186490 | A1* | 6/2024 | Cheng | H01M 4/136 |

FOREIGN PATENT DOCUMENTS

| | | | | | |
|---|---|---|---|---|---|
| CN | 106340639 | A | | 1/2017 | |
| CN | 107240696 | A | * | 10/2017 | H01M 10/0525 |
| CN | 109888205 | A | | 6/2019 | |
| CN | 109888281 | A | | 6/2019 | |
| CN | 112436120 | A | * | 3/2021 | H01M 10/0525 |
| CN | 113270575 | A | | 8/2021 | |
| CN | 114256448 | A | * | 3/2022 | H01M 10/0525 |
| CN | 114843507 | A | | 8/2022 | |
| JP | 2021009838 | A | | 1/2021 | |
| WO | 2021253796 | A1 | | 12/2021 | |
| WO | 2024183803 | A1 | | 9/2024 | |

OTHER PUBLICATIONS

EPO machine generated English translation of CN-107240696-A (Year: 2017).*

EPO machine generated English translation of CN-112436120-A (Year: 2021).*

EPO machine generated English translation of CN-114256448-A (Year: 2022).*

European Search report for 23754096.8, prepared by the European Patent Office, mailing date Nov. 10, 2025, 6 pages.

* cited by examiner

SINGLE-CORE MULTI-SHELL LITHIUM MANGANESE IRON PHOSPHATE CATHODE MATERIAL, PREPARATION METHOD, AND SECONDARY BATTERY

CROSS-REFERENCE TO RELATED APPLICATIONS

This application is the U.S. national phase of International Application No. PCT/CN2023/083117 with an international filing date of Mar. 22, 2023, designating the U.S., now pending, and claims the priority of the Chinese patent application with an application number 202210309750.1 and titled "SINGLE-CORE MULTI-SHELL LITHIUM MANGANESE IRON PHOSPHATE CATHODE MATERIAL, PREPARATION METHOD, AND SECONDARY BATTERY" filed with China Patent Office on Mar. 28, 2022, the entire contents of which are incorporated herein by reference.

TECHNICAL FIELD

The present application relates to the technical field of battery materials, and more particularly to a single-core multi-shell lithium manganese iron phosphate cathode material and a preparation method thereof, and a secondary battery.

BACKGROUND

A lithium-ion battery is advantageous in, for example, high operating voltage, low self-discharge, and good safety. The lithium-ion battery is mainly composed of a cathode material, an anode material, an electrolyte, a separator, and a casing. The cathode material mainly includes: lithium cobalt oxide, lithium manganese oxide, a nickel-manganese binary system, a nickel-cobalt-manganese ternary system, and a nickel-cobalt-aluminum ternary system, lithium iron phosphate, lithium manganese iron phosphate, and the like. Among them, lithium iron phosphate ($LiFePO_4$) is advantageous of low cost, high safety, and good cycle life. Lithium manganese iron phosphate (LMFP, $LiMn_{1-x}FexPO_4$) is developed on the basis of lithium iron phosphate modification, and is a solid solution material composed of lithium iron phosphate and lithium manganese phosphate, thus having similar properties to lithium iron phosphate and lithium manganese phosphate, as well as having good thermal and chemical stability. Compared with lithium iron phosphate, lithium manganese iron phosphate has a higher voltage platform. The voltage of lithium manganese iron phosphate can reach about 4.1 V, while the voltage of lithium iron phosphate is about 3.4 V to 3.5V; both of them have the same theoretical gram capacity, due to having a higher voltage, lithium manganese iron phosphate has a theoretical energy density being 15% to 20% higher than that of lithium iron phosphate under the same conditions, as well as improved electrical conductivity and lithium ion conductivity compared with lithium manganese phosphate, thus being a cathode material worthy of attention. However, the conductivity of a single lithium manganese iron phosphate material is very poor, and pure lithium manganese iron phosphate is almost an insulator, so it is difficult to fully exert the electrochemical properties of the material. Although the conductivity of the material after carbon coating has been improved to a certain extent, the conductivity of the material is still poor, and the electrochemical properties of the material is still difficult to fully exert.

The existing preparation method for a lithium manganese iron phosphate cathode material in a core-shell structure includes the steps of: mixing a manganese source, a phosphorus source, an iron source, a lithium source, a carbon source, and a compound of a doping element to obtain a first mixture; pre-calcining the first mixture under a protective atmosphere to obtain a precursor; mixing the precursor with the manganese source, the phosphorus source, the lithium source, an iron source, and the compound of the doping element to obtain a second mixture; calcining the second mixture under a protective atmosphere to obtain the lithium manganese iron phosphate in the core-shell structure. Due to the use of pure materials to prepare lithium manganese iron phosphate, not only do problems such as expensive raw materials, high cost, and difficulty in realizing industrialized production exist; but also electrochemical properties including the cycle performance, discharge efficiency, energy density, tap density need to be improved, thus limiting its application.

SUMMARY

It is one of objectives of embodiments of the present application to provide a single-core multi-shell lithium manganese iron phosphate cathode material, a preparation method thereof, and a secondary battery, aiming to solve the problem to a certain extent that the chemical properties of the existing lithium manganese iron phosphate cathode material need to be improved.

In order to solve the above technical problems, embodiments of the present application adopt the following technical solutions:

In the first aspect, a single-core multi-shell lithium manganese iron phosphate composite material is provided. The composite material comprises: a carbon-coated lithium iron phosphate core, and a plurality of lithium manganese iron phosphate cladding layers cladded on an outer surface of the carbon-coated lithium iron phosphate core. Each of the plurality of lithium manganese iron phosphate cladding layers comprises lithium manganese iron phosphate particles and a carbon material coated on the lithium manganese iron phosphate particles. The lithium manganese iron phosphate particles in the plurality of the lithium manganese iron phosphate cladding layers have particle sizes increasing in a radial direction from an inside to an outside of the single-core multi-shell lithium manganese iron phosphate composite material.

In a second aspect, a method for preparing a single-core multi-shell lithium manganese iron phosphate composite material is provided. The method comprises the following steps:

- preparing carbon-coated lithium iron phosphate particles;
- preparing carbon-coated lithium manganese iron phosphate particles having different particle sizes;
- forming the carbon-coated lithium iron phosphate particles into a carbon-coated lithium iron phosphate core, sequentially preparing a plurality of lithium manganese iron phosphate cladding layers on an outer surface of the carbon-coated lithium iron phosphate core, according to an order of particle sizes of the carbon-coated lithium manganese iron phosphate particles sequentially increasing, to form the plurality of lithium manganese iron phosphate cladding layers, thereby obtaining the single-core multi-shell lithium manganese iron phosphate composite material.

In a third aspect, a secondary battery is provided. A cathode material of the secondary battery contains the above-mentioned single-core multi-shell lithium manganese iron phosphate composite material, or contains a single-core multi-shell lithium manganese iron phosphate composite material prepared by the above method.

Advantages of the single-core multi-shell lithium manganese iron phosphate composite material provided by embodiments of the present application are summarized as follows: lithium iron phosphate in the form of a large-sized particle is used as a core carrier, thus having good high-rate performance, excellent low-temperature performance, high compaction density, and excellent cycle performance, long service life, high energy retention rate, good structural stability, and high safety performance. In addition, multi-layer cladding technology is used to form a plurality of lithium manganese iron phosphate cladding layers on the outer surface of the core, so as to achieve higher voltage platform and energy density. On the one hand, the cladding layers comprise lithium manganese iron phosphate particles and carbon materials, the coating of the lithium manganese iron phosphate particles with the carbon material can not only effectively control the size of lithium manganese iron phosphate particles, avoid the formation of large particles during the treatments, but also effectively improve the conductivity of lithium manganese iron phosphate particles, thereby improving the electrochemical properties of the composite material. Moreover, the carbon material covering the lithium manganese iron phosphate particles plays a role of compact filling among the lithium manganese iron phosphate particles, which can effectively improve the compaction density of the composite material. On the other hand, the particle sizes of lithium manganese iron phosphate particles in the plurality of lithium manganese iron phosphate cladding layers increase radially from inside to outside. Due to the long conduction distance of carriers in the inner layer of the composite material, the cladding layer close to the core adopts lithium manganese iron phosphate particles with smaller particle sizes, which is beneficial to improve the discharge efficiency of the composite material; while the carriers in the outer layer of the composite material has a short conduction distance, so compared with the inner cladding layer, the outer cladding layer uses lithium manganese iron phosphate particles with relatively large particle sizes, which is beneficial to improve the compaction density of the composite material.

Advantages of the preparation method of the single-core multi-shell lithium manganese iron phosphate composite material provided in embodiments of the present application are summarized as follows: the carbon-coated lithium iron phosphate particles and carbon-coated lithium manganese iron phosphate particles having different particle sizes are respectively prepared, in which, carbon coating is not only beneficial to improve the electrical conductivity of the material, but also to maintain the particle sizes of lithium iron phosphate particles and the particle sizes of the lithium manganese iron phosphate particles, which avoids the aggregation and growth of particles in the subsequent preparation process. After that, the carbon-coated lithium iron phosphate particles are formed into the core, and a plurality of lithium manganese iron phosphate cladding layers are sequentially prepared on an outer surface of the core using the multi-layer cladding technology, according to an order of particle sizes of the carbon-coated lithium manganese iron phosphate particles sequentially increasing, to form the plurality of lithium manganese iron phosphate cladding layers according to a particle size gradient. The preparation process is simple, suitable for large-scale industrial production and application, and the carbon-coated lithium iron phosphate core and the plurality of lithium manganese iron phosphate cladding layers in the preparation of single-core multi-shell lithium iron phosphate composite material play synergistic effect, which makes the composite material have high energy density, electrical conductivity, compaction density, safety, stability, and other electrochemical properties.

Advantages of the secondary battery provided by embodiments of the present application are summarized as follows: due to the inclusion of the above-mentioned single-core multi-shell lithium manganese iron phosphate composite material, which has high energy density, electrical conductivity, compaction density, safety, stability, and other electrochemical properties, the electrochemical properties of the secondary battery is improved.

DESCRIPTION OF THE DRAWINGS

In order to more clearly illustrate the technical solutions in the embodiments of the present application, the drawings that need to be used in the description of the embodiments or the prior art will be briefly described hereinbelow. Obviously, the accompanying drawings in the following description are only some embodiments of the present application. For those skilled in the art, other drawings can be obtained based on these drawings without creative work.

DETAILED DESCRIPTION OF THE EMBODIMENTS

In order to make the purpose, technical solution and advantages of the present application more clearer, the present application will be described in detail below in conjunction with the accompanying drawings and embodiments. It should be understood that the specific embodiments described here are only used to explain the present application, rather than limit the present application.

In order to illustrate the technical solution described in the present application, the following will be described in detail in conjunction with specific drawings and embodiments.

Figure 1:
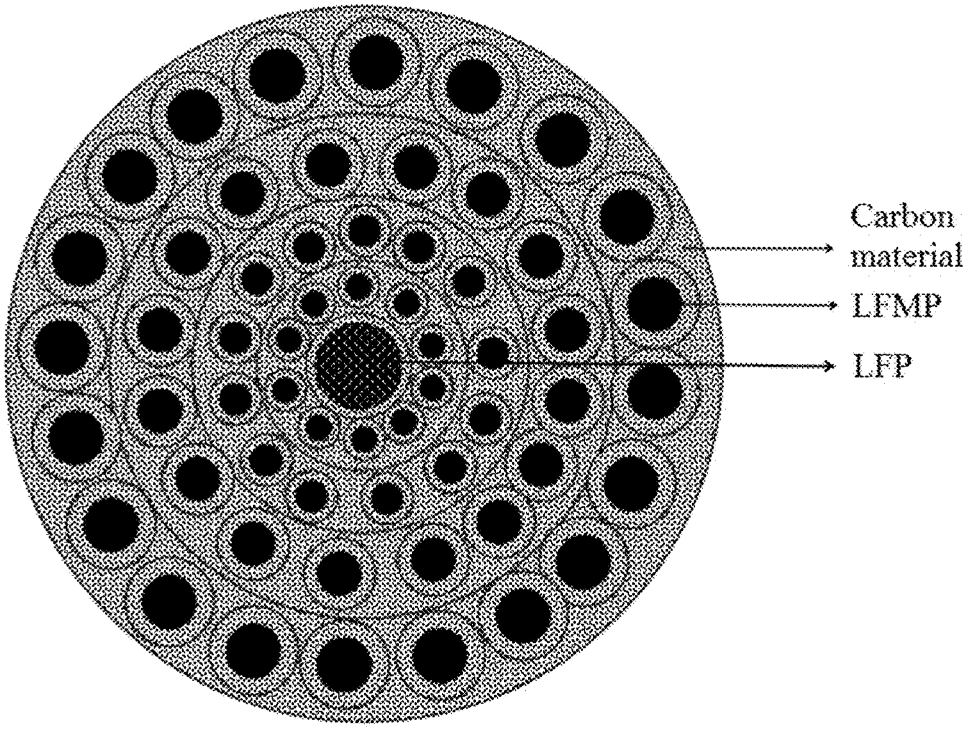
FIG. 1 is a schematic structural diagram of a single-core multi-shell lithium manganese iron phosphate composite material provided by embodiments of the present application.

As shown in FIG. 1, a first aspect of embodiments of the present application provides a single-core multi-shell lithium manganese iron phosphate composite material. The composite material comprises: a carbon-coated lithium iron phosphate core, and a plurality of lithium manganese iron phosphate cladding layers cladded on an outer surface of the carbon-coated lithium iron phosphate core. Each of the plurality of lithium manganese iron phosphate cladding layers comprises lithium manganese iron phosphate particles and a carbon material coated on the lithium manganese iron phosphate particles. The lithium manganese iron phosphate particles in the plurality of the lithium manganese iron phosphate cladding layers have particle sizes increasing in a radial direction from an inside to an outside of the single-core multi-shell lithium manganese iron phosphate composite material.

In the single-core multi-shell lithium manganese iron phosphate composite material provided by the first aspect, the carbon-coated lithium iron phosphate is employed as the core, and the plurality of lithium manganese iron phosphate cladding layers are employed as the shell. Each of the plurality of lithium manganese iron phosphate cladding layers comprises lithium manganese iron phosphate particles and a carbon material coated on the lithium manganese iron phosphate particles. The lithium manganese iron phosphate particles in the plurality of the lithium manganese iron phosphate cladding layers of the shell have the particle sizes increase in the radial direction from inside to outside. The composite material in embodiments of the present application adopts lithium iron phosphate in the form of a large-sized particle as the core carrier, which has good high-rate performance, excellent low-temperature performance, high compaction density, and excellent cycle performance, long service life, high energy retention rate, good structural stability, and high safety performance. In addition, multi-layer cladding technology is used to form a plurality of lithium manganese iron phosphate cladding layers on the outer surface of the core, so as to achieve higher voltage platform and energy density. On the one hand, the cladding layers comprise lithium manganese iron phosphate particles and carbon materials, the coating of the lithium manganese iron phosphate particles with the carbon material can not only effectively control the size of lithium manganese iron phosphate particles, avoid the formation of large particles during the treatments, but also effectively improve the conductivity of lithium manganese iron phosphate particles, thereby improving the electrochemical properties of the composite material. Moreover, the carbon material covering the lithium manganese iron phosphate particles plays a role of compact filling among the lithium manganese iron phosphate particles, which can effectively improve the compaction density of the composite material. On the other hand, the particle sizes of lithium manganese iron phosphate particles in the plurality of lithium manganese iron phosphate cladding layers increase radially from inside to outside. Due to the long conduction distance of carriers in the inner layer of the composite material, the cladding layer close to the core adopts lithium manganese iron phosphate particles with smaller particle sizes, which is beneficial to improve the discharge efficiency of the composite material; while the carriers in the outer layer of the composite material has a short conduction distance, so compared with the inner cladding layer, the outer cladding layer uses lithium manganese iron phosphate particles with relatively large particle sizes, which is beneficial to improve the compaction density of the composite material. In embodiments of the present application, based on the lithium iron phosphate core and multiple shell layers of lithium manganese iron phosphate, as well as the regular arrangement of the particle sizes, the composite material has high energy density, electrical conductivity, compaction density, safety, stability, and other electrochemical properties.

In some embodiments, the carbon-coated lithium iron phosphate core comprises a plurality of lithium iron phosphate particles, in which, a particle size of each of the lithium iron phosphate particles is between 500 nm and 900 nm, and a thickness of a carbon coating layer is between 3 nm and 5 nm. The lithium iron phosphate particles with such particle sizes are beneficial to the composite material to have better electrical properties and compaction density. The thickness of the carbon coating layer can effectively improve the electrical conductivity of the composite material. If the carbon coating layer is too thin, the improvement effect on the electrical conductivity of the composite material is not good. If the carbon coating layer is too thick, the proportion of lithium iron phosphate, lithium manganese iron phosphate and the like in the composite material will reduce, thereby reducing the electrochemical properties of the composite material. In some specific embodiments, the particle size of each of the lithium iron phosphate particles in the carbon-coated lithium iron phosphate core includes but is not limited to between 500 nm and 600 nm, between 600 nm and 700 nm, between 700 nm and 800 nm, between 800 nm and 900 nm, and the like, and the thickness of the carbon coating layer includes but not limited to between 3 nm and 4 nm, between 4 nm and 5 nm, and the like.

In some embodiments, in the plurality of lithium manganese iron phosphate cladding layers, the particle size of each of the lithium manganese iron phosphate particles is between 50 nm and 300 nm, and a coating thickness of the carbon material is between 3 nm and 10 nm. Each of the lithium manganese iron phosphate cladding layer in embodiments of the present application includes lithium manganese iron phosphate particles and a carbon material coated with lithium manganese iron phosphate particles, in which, the lithium manganese iron phosphate particles have the particle sizes between 50 nm and 300 nm, which, compared with those lithium manganese iron phosphate particles having relatively small particle sizes, can shorten the charge transfer distance and improve the charge transfer efficiency. In addition, the coating thickness of the carbon material is between 3 nm and 10 nm, which can effectively improve the conductivity of the lithium manganese iron phosphate particles, and can prevent the lithium manganese iron phosphate particles from growing up during the treatment process, thereby being conducive to maintaining the stability of the particle sizes of the lithium manganese iron phosphate particles. In some specific embodiments, the particle size of each of the lithium manganese iron phosphate particles in each lithium manganese iron phosphate cladding layer includes but is not limited to between 50 nm and 100 nm, between 100 nm and 150 nm, between 150 nm and 200 nm, between 200 nm and 250 nm, between 250 nm and 300 nm, and the like. The coating thickness of the material includes but is not limited to between 3 nm and 4 nm, between 4 nm and 6 nm, between 6 nm and 8 nm, between 8 nm and 10 nm, and the like.

In some embodiments, in the composite material, a mass ratio of lithium iron phosphate particles to the lithium manganese iron phosphate particles is (1 to 50):(300 to 500). This ratio makes the composite material have high energy density, high compaction density, safety, stability, and other electrochemical properties.

In some embodiments, a mass ratio of lithium iron phosphate particles to the lithium manganese iron phosphate particles is 1:(300 to 500). This ratio makes the composite material have better energy density, compaction density, safety, stability, and other electrochemical properties. If the proportion of lithium iron phosphate in the composite material is too high, it is not conducive to improving the performance of the composite material such as voltage platform and energy density. If the proportion of lithium manganese iron phosphate is too high, the shortcomings of lithium's low electrical conductivity and longer lithium ion transport channels make it difficult for the material to release electrical properties. In some specific embodiments, in the composite material, the mass ratio of lithium iron phosphate to lithium manganese iron phosphate particles includes but is not limited to 1:(300 to 350), 1:(350 to 400), 1:(400 to 450), 1:(450 to 50), and the like.

In some embodiments, a total thickness of the plurality of lithium manganese iron phosphate cladding layers is between 6.4 μm and 7.5 μm. The cladding layer of this thickness is not only beneficial to improving the voltage platform of the composite material, the discharge efficiency of the material, as well as improving the energy density and compaction density of the material, but also avoids the shortcoming of the low release efficiency of the electrical properties of the composite material due to the excessive thickness of the cladding layer. In some specific embodiments, the total thickness of the plurality of lithium manganese iron phosphate cladding layers includes, but is not limited to, 6.4 μm, 6.5 μm, 6.6 μm, 6.7 μm, 6.8 μm, 6.9 μm, 7.0 μm, 7.1 μm, 7.2 μm, 7.3 μm, 7.4 μm, 7.5 μm, etc.

In some embodiments, the single-core multi-shell lithium manganese iron phosphate composite material comprises four lithium manganese iron phosphate cladding layers, which, in the radial direction from the inside to the outside of the single-core multi-shell lithium manganese iron phosphate composite material, are respectively a first lithium manganese iron phosphate cladding layer, a second lithium manganese iron phosphate cladding layer, a third lithium manganese iron phosphate cladding layer, and a fourth lithium manganese iron phosphate cladding layer. In the composite material in embodiments of the present application, four lithium manganese iron phosphate cladding layers are cladded on the outer surface of the carbon-coated lithium iron phosphate core, and the particle sizes of lithium manganese iron phosphate particles in the respective cladding layers increase radially from inside to outside. Due to the long conduction distance of carriers in the inner layer of the composite material, the cladding layer close to the core adopts lithium manganese iron phosphate particles with smaller particle sizes, which is beneficial to improve the discharge efficiency of the composite material; while the carriers in the outer layer of the composite material has a short conduction distance, the outer cladding layer uses lithium manganese iron phosphate particles with relatively large particle sizes, which is beneficial to improve the compaction density of the composite material. In the composite material of embodiments of the present application, the performance of the lithium manganese iron phosphate cladding layer structure is much better in case of 4 layers. If the number of cladding layers is lower than 4 layers, the proportion of the lithium iron phosphate core is too high, which reduces the advantage of high voltage of the lithium manganese iron phosphate, leading to the decrease in electrical properties. If the number of cladding layers is higher than 4, the conduction distance of the first lithium manganese iron phosphate cladding layer (that is, the innermost cladding layer) will become longer, which will also affect the electrical properties of lithium manganese iron phosphate. The composite material includes four lithium manganese iron phosphate cladding layers, which not only overcomes the disadvantage of poor electrical properties caused by the long conduction distance of the inner layer of the composite material, but also overcomes the disadvantage of rapid compaction reduction due to the improvement of electrical properties.

In addition, a mass ratio of the lithium manganese iron phosphate particles in the first lithium manganese iron phosphate cladding layer, the second lithium manganese iron phosphate cladding layer, the third lithium manganese iron phosphate cladding layer, and the fourth lithium manganese iron phosphate cladding layer is (3 to 5):(9 to 12):(60 to 80):(250 to 350). Due to the low conductivity of lithium manganese iron phosphate, the higher the manganese content, the lower the conductivity, the smaller the particles, the lower the manganese content, and the larger the particles, the higher the manganese content. Moreover, based on the distance between the core and the surface layer, the particle sizes of lithium manganese iron phosphate particles in each cladding layer increase in the radial direction from inside to outside, and the thickness increases sequentially from inside to outside, which is more conducive to improving the electrochemical properties of the composite material.

In some embodiments, the first lithium manganese iron phosphate cladding layer has a thickness between 400 nm and 600 nm, and the lithium manganese iron phosphate particles in the first lithium manganese iron phosphate cladding layer have particle sizes between 50 nm and 150 nm. The second lithium manganese iron phosphate cladding layer has a thickness between 900 nm and 1000 nm, and the lithium manganese iron phosphate particles in the second lithium manganese iron phosphate cladding layer have particle sizes between 100 nm and 200 nm. The third lithium manganese iron phosphate cladding layer has a thickness between 1900 nm and 2000 nm, and the lithium manganese iron phosphate particles in the third lithium manganese iron phosphate cladding layer have particle sizes between 150 nm and 250 nm. The fourth lithium manganese iron phosphate cladding layer has a thickness between 3900 nm and 4000 nm, and the lithium manganese iron phosphate particles in the fourth lithium manganese iron phosphate cladding layer have particle sizes between 200 nm and 300 nm. Under cladding layers in such conditions, it is more beneficial to improve the voltage platform of the composite material, improve the energy density, the compaction density, and other electrochemical properties, as well as ensure excellent electrical conductivity of the composite material.

The single-core multi-shell lithium manganese iron phosphate composite material in embodiments of the present application can be prepared by methods in the following embodiments.

Figure 2:
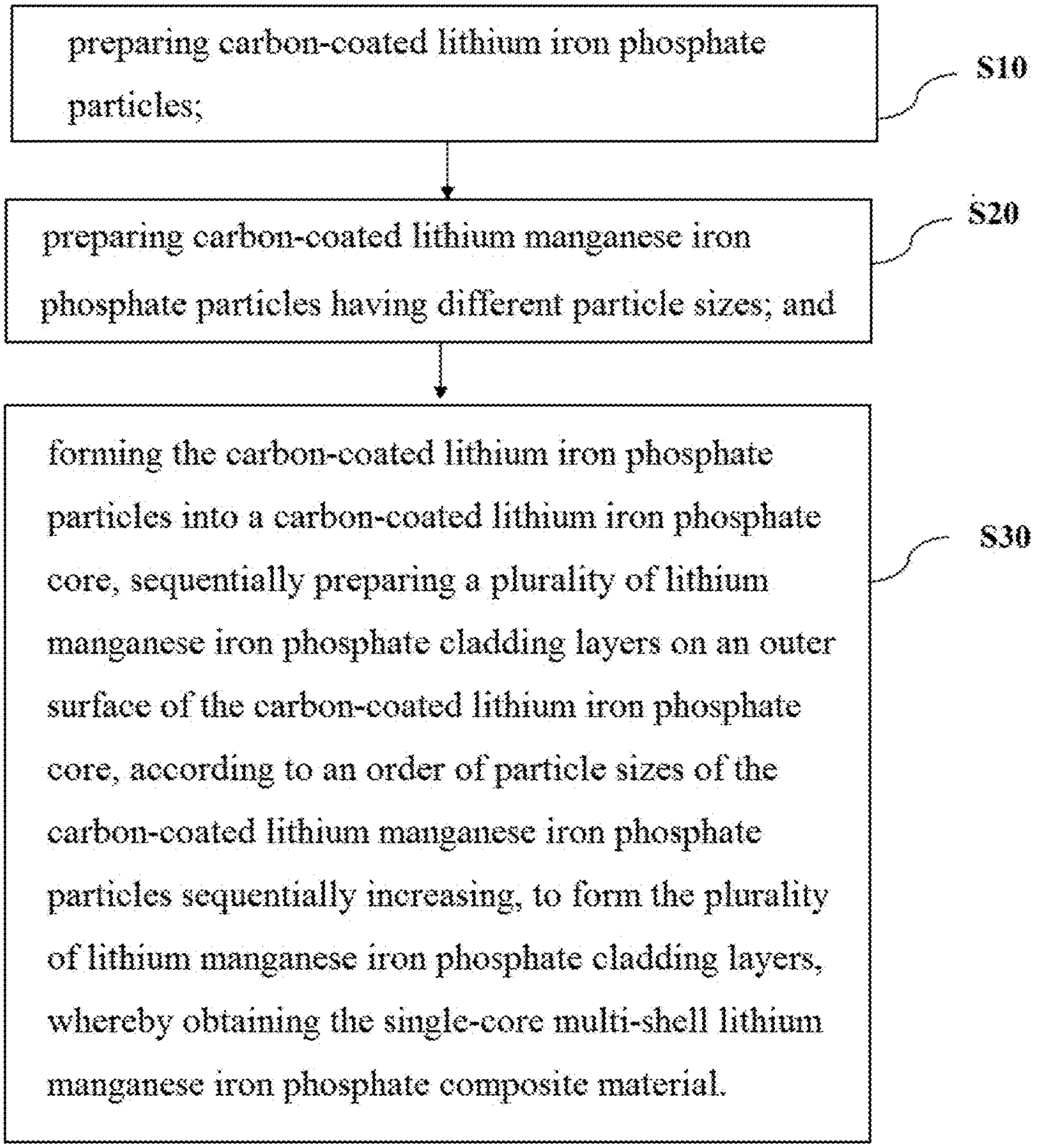
FIG. 2 is a schematic flow chart of a preparation method for a single-core multi-shell lithium manganese iron phosphate composite material provided by embodiments of the present application.

As shown in FIG. 2, the second aspect of embodiments of the present application provides a method for preparing a single-core multi-shell lithium manganese iron phosphate composite material. The method comprises the following steps:

- step S10, preparing carbon-coated lithium iron phosphate particles;
- step S20, preparing carbon-coated lithium manganese iron phosphate particles having different particle sizes; and
- step S30, forming the carbon-coated lithium iron phosphate particles into a carbon-coated lithium iron phosphate core, sequentially preparing a plurality of lithium manganese iron phosphate cladding layers on an outer surface of the carbon-coated lithium iron phosphate core, according to an order of particle sizes of the carbon-coated lithium manganese iron phosphate particles sequentially increasing, to form the plurality of lithium manganese iron phosphate cladding layers, thereby obtaining the single-core multi-shell lithium manganese iron phosphate composite material.

In the preparation method of the single-core multi-shell lithium manganese iron phosphate composite material provided by the second aspect of embodiments of the present application, the carbon-coated lithium iron phosphate particles and carbon-coated lithium manganese iron phosphate particles having different particle sizes are respectively prepared, in which, carbon coating is not only beneficial to improve the electrical conductivity of the material, but also to maintain the particle sizes of lithium iron phosphate particles and the particle sizes of the lithium manganese iron phosphate particles, which avoids the aggregation and growth of particles in the subsequent preparation process. After that, the carbon-coated lithium iron phosphate particles are formed into the core, and a plurality of lithium manganese iron phosphate cladding layers are sequentially prepared on an outer surface of the core using the multi-layer cladding technology, according to an order of particle sizes of the carbon-coated lithium manganese iron phosphate particles sequentially increasing, to form the plurality of lithium manganese iron phosphate cladding layers according to a particle size gradient. The preparation process is simple, suitable for large-scale industrial production and application, and the carbon-coated lithium iron phosphate core and the plurality of lithium manganese iron phosphate cladding layers in the preparation of single-core multi-shell lithium iron phosphate composite material play synergistic effect, which makes the composite material have high energy density, electrical conductivity, compaction density, safety, stability, and other electrochemical properties.

In some embodiments, in the above step S10, the step of preparing carbon-coated lithium iron phosphate particles comprises: combining lithium iron phosphate with a first carbon source, and performing a first sintering treatment to obtain the carbon-coated lithium iron phosphate particles. In embodiments of the present application, by mixing lithium iron phosphate and carbon source and performing sintering treatment, not only can the stability of lithium iron phosphate be improved, but also a carbon coating layer can be formed in situ on the surface of each of the lithium iron phosphate particles, so as to obtain the carbon-coated lithium iron phosphate particles.

In some embodiments, conditions for the first sintering treatment comprise: sintering in an inert atmosphere at a temperature between 750° C. and 800° C. for 5 hrs to 8 hrs. The sintering treatment under such conditions is conducive to improving the performance of lithium iron phosphate, and is also beneficial for the carbon material to form a carbon coating layer in situ on the surface of the lithium iron phosphate particle. If the sintering temperature is too low or the time is too short, it is not conducive to improving the stability of lithium iron phosphate particles, and it is also not conducive to the formation of the carbon coating layer; if the sintering temperature is too high or the time is too long, it will cause the particle sizes of lithium iron phosphate particles being too large, and the electrochemical properties of the material will be affected.

In some embodiments, the first carbon source is at least one selected from sucrose, glucose, oxalic acid, salicylic acid, citric acid, tartaric acid, malic acid, glycine, ethylenediaminetetraacetic acid, and succinic acid. During the high-temperature sintering treatment, such carbon source can be converted into gaseous hydrocarbons, and a carbon coating layer is deposited on the surface of lithium iron phosphate particles.

In some embodiments, the mass ratio of lithium iron phosphate to the first carbon source includes but is not limited to 1:(0.1 to 0.3), and this mass ratio is conducive to the formation of lithium iron phosphate having a particle size between 500 nm and 900 nm and the formation of a carbon coating layer having a thickness between 3 nm and 5 nm through sintering treatment. The lithium iron phosphate particles having such a particle size are conducive to having better electrical properties in the composite material. Such thickness of the carbon coating layer can effectively improve the electrical conductivity of the composite material. If the carbon coating layer is too thin, the effect of improving the electrical conductivity of the material is not good. If the carbon coating layer is too thick, the proportion of lithium iron phosphate, lithium manganese iron phosphate, and other materials in the composite material will be reduced, thereby reducing the electrochemical properties of the composite material.

In some embodiments, in the above step S20, the step of preparing carbon-coated lithium manganese iron phosphate particles having different particle sizes comprises:

step S21, mixing lithium manganese iron phosphate with a second carbon source, and performing a second sintering treatment to obtain first carbon-coated lithium manganese iron phosphate particles;

step S22, mixing lithium manganese iron phosphate with a third carbon source, and performing a third sintering treatment to obtain second carbon-coated lithium manganese iron phosphate particles;

step S23, mixing lithium manganese iron phosphate with a fourth carbon source, and performing a fourth sintering treatment to obtain third carbon-coated lithium manganese iron phosphate particles; and step S24, mixing lithium manganese iron phosphate with a fifth carbon source, and performing a fifth sintering treatment to obtain fourth carbon-coated lithium manganese iron phosphate particles.

Temperatures of the second sintering treatment, the third sintering treatment, the fourth sintering treatment, and the fifth sintering treatment sequentially increase and are between 630° C. and 800° C.

In the embodiment of the present application, by adjusting the sintering temperature of lithium manganese iron phosphate and the carbon source, the particle sizes of lithium manganese iron phosphate particles can be controlled. The higher the sintering temperature is, the larger the particle sizes of the formed lithium manganese iron phosphate particles are. Under the condition of the sintering temperature between 630° C. and 800° C., as the temperatures of the second sintering treatment to the fifth sintering treatment increase sequentially, particle sizes of the obtained first carbon-coated lithium manganese iron phosphate particles to the fourth carbon-coated lithium manganese iron phosphate particles increase sequentially.

In some embodiments, in the above step S21, conditions for the second sintering treatment comprise: sintering in an inert atmosphere at a temperature between 630° C. and 650° C. for 5 hrs to 8 hrs. Under such sintering treatment conditions, the carbon source can form a coating layer on the surface of the lithium manganese iron phosphate in situ. In the prepared first carbon-coated lithium manganese iron phosphate particles, the particle size of each of the lithium manganese iron phosphate particles is between 50 nm and 150 nm, and the thickness of each carbon coating layer is between 3 nm and 5 nm. The lithium manganese iron phosphate particle having a small particle size has a short charge transfer path and high charge transfer efficiency. The carbon coating layer generated in situ can not only improve the electrical conductivity, but also help limit the continuous growth of lithium manganese iron phosphate particle sizes and help maintain the particle sizes.

In some embodiments, in the above step S22, conditions for the third sintering treatment comprise: sintering in an inert atmosphere at a temperature between 650° C. and 680° C. for 5 hrs to 8 hrs. In the prepared second carbon-coated lithium manganese iron phosphate particles, the particle size of each lithium manganese iron phosphate particle is between 100 nm and 200 nm, and the thickness of each carbon coating layer is between 3 nm and 5 nm. The lithium manganese iron phosphate particle having a small particle size has a short charge transfer path and high charge transfer efficiency. The carbon coating layer generated in situ can not only improve the electrical conductivity, but also help limit the continuous growth of lithium manganese iron phosphate particle size and help maintain the particle size.

In some embodiments, in the above step S23, conditions for the fourth sintering treatment comprise: sintering in an inert atmosphere at a temperature between 700° C. and 730° C. for 5 hrs to 8 hrs. In the prepared third carbon-coated lithium manganese iron phosphate particles, the particle size of each lithium manganese iron phosphate particle is between 150 nm and 250 nm, and the thickness of each carbon coating layer is between 3 nm and 5 nm. Particles having such particle size, when being used as the third cladding layer, is conductive to improving the tap density of the composite material, and the carbon coating layer generated in situ can not only improve the electrical conductivity, but also help limit the continuous growth of lithium manganese iron phosphate particle size and help maintain the particle size.

In some embodiments, in the above step S24, conditions for the fifth sintering treatment comprise: sintering in an inert atmosphere at a temperature between 750° C. and 800° C. for 5 hrs to 8 hrs. In the prepared fourth carbon-coated lithium manganese iron phosphate particles, the particle size of each lithium manganese iron phosphate particle is between 200 nm and 300 nm, and the thickness of the carbon coating layer is between 3 nm and 5 nm. Particles having such particle size, when being used as the third cladding layer, is conductive to improving the tap density of the composite material, and the carbon coating layer generated in situ can not only improve the electrical conductivity, but also help limit the continuous growth of lithium manganese iron phosphate particle size and help maintain the particle size.

In some embodiments, each of the second carbon source, the third carbon source, the fourth carbon source, and the fifth carbon source is independently at least one selected from sucrose, glucose, oxalic acid, salicylic acid, citric acid, tartaric acid, malic acid, glycine, ethylenediaminetetraacetic acid, and succinic acid. These carbon sources can be converted into gaseous hydrocarbons during the high-temperature sintering treatment, and a carbon coating layer is deposited on the surface of the lithium manganese iron phosphate particles to improve the particle size stability and electrical conductivity of the particles.

In some embodiments, in the above step S30, the step of sequentially preparing a plurality of lithium manganese iron phosphate cladding layers on an outer surface of the carbon-coated lithium iron phosphate core comprises:

step S31, cladding the first carbon-coated lithium manganese iron phosphate particles on a surface of the carbon-coated lithium iron phosphate core, performing a sixth sintering treatment in the presence of a sixth carbon source to form a first lithium manganese iron phosphate cladding layer, thereby obtaining a first cladded body;

step S32, cladding the second carbon-coated lithium manganese iron phosphate particles on a surface of the first cladded body, performing a seventh sintering treatment in the presence of a seventh carbon source to form a second lithium manganese iron phosphate cladding layer, thereby obtaining a second cladded body;

step S33, cladding the third carbon-coated lithium manganese iron phosphate particles on a surface of the second cladded body, performing an eighth sintering treatment in the presence of a eighth carbon source to form a third lithium manganese iron phosphate cladding layer, thereby obtaining a third cladded body; and step S34, cladding the fourth carbon-coated lithium manganese iron phosphate particles on a surface of the third cladded body, performing a ninth sintering treatment in the presence of a ninth carbon source to form a fourth lithium manganese iron phosphate cladding layer, thereby obtaining a fourth cladded body.

Embodiments of the present application adopt multi-layer cladding technology to make the first carbon-coated lithium manganese iron phosphate particles to the fourth carbon-coated lithium manganese iron phosphate particles with particle sizes ranging from small to large be sequentially cladded on the outer surface of the carbon-coated lithium iron phosphate core, so as to form the first lithium manganese iron phosphate cladding layer, the second lithium manganese iron phosphate cladding layer, the third lithium manganese iron phosphate cladding layer, and the fourth lithium manganese iron phosphate cladding layer sequentially.

In some embodiments, in the single-core multi-shell lithium manganese iron phosphate composite material, a mass ratio of the first carbon-coated lithium manganese iron phosphate particles, the second carbon-coated lithium manganese iron phosphate particles, the third carbon-coated lithium manganese iron phosphate particles, the fourth carbon-coated lithium manganese iron phosphate particles is (3 to 5):(9 to 12):(60 to 80):(250 to 350). Due to the low conductivity of lithium manganese iron phosphate, the higher the manganese content, the lower the conductivity, the smaller the particles, the lower the manganese content, and the larger the particles, the higher the manganese content. Moreover, based on the distance between the core and the surface layer, the particle sizes of lithium manganese iron phosphate particles in each cladding layer increase in the radial direction from inside to outside, and the thickness increases sequentially from inside to outside, which is more conducive to improving the electrochemical properties of the composite material.

In some embodiments, each of the sixth carbon source, the seventh carbon source, the eighth carbon source, and the ninth carbon source is independently at least one selected from sucrose, glucose, oxalic acid, salicylic acid, citric acid, tartaric acid, malic acid, glycine, ethylenediaminetetraacetic acid, and succinic acid. These carbon sources can not only re-coat the lithium manganese iron phosphate particles during the sintering treatment, but also fully fill the gaps among the particles, and functions in compact filling, thus can effectively increase the compaction density of the cladding layer.

In some embodiments, conditions for each of the sixth sintering treatment, the seventh sintering treatment, the eighth sintering treatment, and the ninth sintering treatment independently comprise: sintering in an inert atmosphere at a temperature between 600° C. and 650° C. for 2 hrs to 5 hrs. Under this condition, a stable lithium manganese iron phosphate cladding layer can be formed.

A third aspect of the embodiment of the present application provides a secondary battery, the cathode material of the secondary battery contains the single-core multi-shell manganese iron phosphate composite material as described in the above, or contains the single-core multi-shell manganese phosphate composite material prepared by the method as described in the above.

Due that the secondary battery provided by the third aspect of embodiments of the present application contains the above-mentioned single-core multi-shell lithium manganese iron phosphate composite material, which has high energy density, electrical conductivity, compaction density, safety, stability, and other electrochemical properties, the electrochemical properties of the secondary battery is improved.

In order to make the above-mentioned implementation details and operations of the present application clearly understood by those skilled in the art, as well as the remarkable performance of the single-core multi-shell lithium manganese iron phosphate composite material and the preparation method thereof in embodiments of the present application, the above-mentioned technical solutions are further explained by implementing multiple examples hereinbelow.

Example 1

A single-core multi-shell lithium manganese iron phosphate composite material was prepared by the following steps:

In step 1, 1 g of lithium iron phosphate (LFP) was collected, placed in a tube furnace, and introduced with nitrogen gas, then added with 0.2 g of glucose, calcined at 750° C. for 5 hrs, and ball milled to obtain a carbon-coated lithium iron phosphate core.

In step 2, 400 g of lithium manganese iron phosphate (LFMP) was placed in a tube furnace and introduced with nitrogen gas, and then added with 80 g of glucose for mixing to yield a resulting mixture. Thereafter, 4 g of the resulting mixture was taken and calcined at 630° C. for 5 hrs to obtain a first carbon-coated lithium manganese iron phosphate particles; 12 g of the resulting mixture was taken and calcined at 670° C. for 5 hrs to obtain a second carbon-coated lithium manganese iron phosphate particles; 84 g of the resulting mixture was taken and calcined at 700° C. for 5 hrs to obtain a third carbon-coated lithium manganese iron phosphate particles; and 300 g of the resulting mixture was taken and calcined at 750° C. for 5 hrs to obtain a fourth carbon-coated lithium manganese iron phosphate particles.

In step 3, the carbon-coated lithium iron phosphate core prepared in step 1 and 4 g of the first carbon-coated lithium manganese iron phosphate particles prepared in step 2 were mixed for 1 hr, transferred to a tube furnace and introduced with nitrogen gas, and then added with 0.1 g of glucose and calcined at 600° C. for 3 hrs to obtain a lithium iron phosphate cladded with a single layer of lithium manganese iron phosphate, that is, the first cladded body.

In step 4, the first cladded body and 12 g of the second carbon-coated lithium manganese iron phosphate particles were ball milled for 1 hr, transferred to a tube furnace and introduced with nitrogen gas, and then added with 0.2 g of glucose and calcined at 600° C. for 3 hrs to obtain a lithium iron phosphate cladded with double layers of lithium manganese iron phosphate, that is, the second cladded body.

In step 5, the second cladded body and 84 g of the third carbon-coated lithium manganese iron phosphate particles were ball milled for 3 hrs, transferred to a tube furnace and introduced with nitrogen gas, and then added with 1 g of glucose and calcined at 600° C. for 5 hrs to obtain a lithium iron phosphate coated with three layers of lithium manganese iron phosphate, that is, the third cladded body.

In step 6, the third cladded body and 300 g of the fourth carbon-coated lithium manganese iron phosphate particles were ball milled for 3 hrs, transferred to a tube furnace and introduced with nitrogen gas, and then added with 3 g of glucose and calcined at 600° C. for 5 hrs to obtain a micron-sized lithium iron phosphate coated with four layers of lithium manganese iron phosphate. The micron-sized lithium iron phosphate coated with four layers of lithium manganese iron phosphate was then crushed and sieved to obtain a single-core multi-shell lithium manganese iron phosphate composite material having a uniform particle size.

Structural characteristics of the composite material were as follows:

Core: LFP particles each had a particle size between 512 nm and 746 nm and a carbon layer thickness was between 3.2 nm and 4.1 nm;

Shell: LFMP particles each had a particle size between 53 nm and 242 nm, specifically, the first layer of LFMP particles had a particle size between 53 nm and 76 mm, a layer thickness between 416 nm and 531 nm, and a carbon layer thickness between 3.5 nm and 3.9 nm;

the second layer of LFMP particles had a particle size between 112 nm and 133 mm, a layer thickness between 924 nm and 1013 nm, and a carbon layer thickness between 3.3 nm and 4.2 nm;

the third layer of LFMP particles had a particle size between 154 nm and 172 mm, a layer thickness between 1931 nm and 2106 nm, and a carbon layer thickness between 3.4 nm and 4.4 nm; and the fourth layer of LFMP particles had a particle size between 214 nm and 228 mm, a layer thickness between 3952 nm and 4100 nm, and a carbon layer thickness between 3.6 nm and 4.4 nm.

Example 2

A single-core multi-shell lithium manganese iron phosphate composite material was prepared by the following steps:

In step 1, 1 g of lithium iron phosphate (LFP) was collected, placed in a tube furnace, and introduced with nitrogen gas, then added with 0.2 g of glucose, calcined at 800° C. for 5 hrs, and ball milled to obtain a carbon-coated lithium iron phosphate core.

In step 2, 500 g of lithium manganese iron phosphate (LFMP) was placed in a tube furnace and introduced with nitrogen gas, and then added with 100 g of glucose for mixing to yield a resulting mixture. Thereafter, 5 g of the resulting mixture was taken and calcined at 650° C. for 5 hrs to obtain a first carbon-coated lithium manganese iron phosphate particles; 15 g of the resulting mixture was taken and calcined at 700° C. for 5 hrs to obtain a second carbon-coated lithium manganese iron phosphate particles; 90 g of the resulting mixture was taken and calcined at 730° C. for 5 hrs to obtain a third carbon-coated lithium manganese iron phosphate particles; and 390 g of the resulting mixture was taken and calcined at 800° C. for 5 hrs to obtain a fourth carbon-coated lithium manganese iron phosphate particles.

In step 3, the carbon-coated lithium iron phosphate core prepared in step 1 and 5 g of the first carbon-coated lithium manganese iron phosphate particles prepared in step 2 were mixed for 1 hr, transferred to a tube furnace and introduced with nitrogen gas, and then added with 0.1 g of glucose and calcined at 650° C. for 3 hrs to obtain a lithium iron phosphate cladded with a single layer of lithium manganese iron phosphate, that is, the first cladded body.

In step 4, the first cladded body and 15 g of the second carbon-coated lithium manganese iron phosphate particles were ball milled for 1 hr, transferred to a tube furnace and introduced with nitrogen gas, and then added with 0.2 g of glucose and calcined at 650° C. for 3 hrs to obtain a lithium iron phosphate cladded with double layers of lithium manganese iron phosphate, that is, the second cladded body.

In step 5, the second cladded body and 90 g of the third carbon-coated lithium manganese iron phosphate particles were ball milled for 3 hrs, transferred to a tube furnace and introduced with nitrogen gas, and then added with 1 g of glucose and calcined at 650° C. for 5 hrs to obtain a lithium iron phosphate coated with three layers of lithium manganese iron phosphate, that is, the third cladded body.

In step 6, the third cladded body and 390 g of the fourth carbon-coated lithium manganese iron phosphate particles were ball milled for 3 hrs, transferred to a tube furnace and introduced with nitrogen gas, and then added with 3 g of glucose and calcined at 650° C. for 5 hrs to obtain a micron-sized lithium iron phosphate coated with four layers of lithium manganese iron phosphate. The micron-sized lithium iron phosphate coated with four layers of lithium manganese iron phosphate was then crushed and sieved to obtain a single-core multi-shell lithium manganese iron phosphate composite material having a uniform particle size.

Structural characteristics of the composite material were as follows:

Core: LFP particles each had a particle size between 686 nm and 812 nm and a carbon layer thickness between 3.1 nm and 3.8 nm;

Shell: LFMP particles each had a particle size between 108 nm and 289 nm, specifically, the first layer of LFMP particles had a particle size between 108 nm and 132 mm, a layer thickness between 460 nm and 573 nm, and a carbon layer thickness between 3.5 nm and 3.9 nm;

the second layer of LFMP particles had a particle size between 153 nm and 183 mm, a layer thickness between 924 nm and 1013 nm, and a carbon layer thickness between 3.2 nm and 4.1 nm;

the third layer of LFMP particles had a particle size between 204 nm and 232 mm, a layer thickness between 2031 nm and 2153 nm, and a carbon layer thickness between 3.3 nm and 4.5 nm; and the fourth layer of LFMP particles had a particle size between 242 nm and 289 mm, a layer thickness between 4052 nm and 4250 nm, and a carbon layer thickness between 3.5 nm and 4.5 nm.

Example 3

A single-core multi-shell lithium manganese iron phosphate composite material was prepared by the following steps:

In step 1, 1 g of lithium iron phosphate (LFP) was collected, placed in a tube furnace, and introduced with nitrogen gas, then added with 0.2 g of glucose, calcined at 750° C. for 5 hrs, and ball milled to obtain a carbon-coated lithium iron phosphate core.

In step 2, 300 g of lithium manganese iron phosphate (LFMP) was placed in a tube furnace and introduced with nitrogen gas, and then added with 60 g of glucose for mixing to yield a resulting mixture. Thereafter, 4 g of the resulting mixture was taken and calcined at 630° C. for 5 hrs to obtain a first carbon-coated lithium manganese iron phosphate particles; 12 g of the resulting mixture was taken and calcined at 670° C. for 5 hrs to obtain a second carbon-coated lithium manganese iron phosphate particles; 74 g of the resulting mixture was taken and calcined at 700° C. for 5 hrs to obtain a third carbon-coated lithium manganese iron phosphate particles; and 210 g of the resulting mixture was taken and calcined at 750° C. for 5 hrs to obtain a fourth carbon-coated lithium manganese iron phosphate particles.

In step 3, the carbon-coated lithium iron phosphate core prepared in step 1 and 4 g of the first carbon-coated lithium manganese iron phosphate particles prepared in step 2 were mixed for 1 hr, transferred to a tube furnace and introduced with nitrogen gas, and then added with 0.1 g of glucose and calcined at 600° C. for 3 hrs to obtain a lithium iron phosphate cladded with a single layer of lithium manganese iron phosphate, that is, the first cladded body.

In step 4, the first cladded body and 12 g of the second carbon-coated lithium manganese iron phosphate particles were ball milled for 1 hr, transferred to a tube furnace and introduced with nitrogen gas, and then added with 0.2 g of glucose and calcined at 600° C. for 3 hrs to obtain a lithium iron phosphate cladded with double layers of lithium manganese iron phosphate, that is, the second cladded body.

In step 5, the second cladded body and 74 g of the third carbon-coated lithium manganese iron phosphate particles were ball milled for 3 hrs, transferred to a tube furnace and introduced with nitrogen gas, and then added with 1 g of glucose and calcined at 600° C. for 5 hrs to obtain a lithium iron phosphate coated with three layers of lithium manganese iron phosphate, that is, the third cladded body.

In step 6, the third cladded body and 210 g of the fourth carbon-coated lithium manganese iron phosphate particles were ball milled for 3 hrs, transferred to a tube furnace and introduced with nitrogen gas, and then added with 3 g of glucose and calcined at 600° C. for 5 hrs to obtain a micron-sized lithium iron phosphate coated with four layers of lithium manganese iron phosphate. The micron-sized lithium iron phosphate coated with four layers of lithium manganese iron phosphate was then crushed and sieved to obtain a single-core multi-shell lithium manganese iron phosphate composite material having a uniform particle size.

Structural characteristics of the composite material were as follows:

Core: LFP particles each had a particle size between 534 nm and 686 nm and a carbon layer thickness between 3.2 nm and 3.6 nm;

Shell: LFMP particles each had a particle size between 120 nm and 190 nm, specifically, the first layer of LFMP particles had a particle size between 101 nm and 141 mm, a layer thickness between 913 nm and 1052 nm, and a carbon layer thickness between 3.4 nm and 4.1 nm;

the second layer of LFMP particles had a particle size between 161 nm and 182 mm, a layer thickness between 1891 nm and 2056 nm, and a carbon layer thickness between 3.5 nm and 4.3 nm;

the third layer of LFMP particles had a particle size between 204 nm and 232 mm, a layer thickness between 2031 nm and 2153 nm, and a carbon layer thickness between 3.3 nm and 4.5 nm; and the fourth layer of LFMP particles had a particle size between 208 nm and 238 mm, a layer thickness between 3882 nm and 4040 nm, and a carbon layer thickness between 3.7 nm and 4.5 nm.

Example 4

A single-core multi-shell lithium manganese iron phosphate composite material was prepared by the following steps:

In step 1, 1 g of lithium iron phosphate (LFP) was collected, placed in a tube furnace, and introduced with nitrogen gas, then added with 0.2 g of glucose, calcined at 750° C. for 5 hrs, and ball milled to obtain a carbon-coated lithium iron phosphate core.

In step 2, 300 g of lithium manganese iron phosphate (LFMP) was placed in a tube furnace and introduced with nitrogen gas, and then added with 60 g of glucose for mixing to yield a resulting mixture. Thereafter, 16 g of the resulting mixture was taken and calcined at 650° C. for 5 hrs to obtain a first carbon-coated lithium manganese iron phosphate particles; 74 g of the resulting mixture was taken and calcined at 700° C. for 5 hrs to obtain a second carbon-coated lithium manganese iron phosphate particles; and 210 g of the resulting mixture was taken and calcined at 800° C. for 5 hrs to obtain a third carbon-coated lithium manganese iron phosphate particles.

In step 3, the carbon-coated lithium iron phosphate core prepared in step 1 and 16 g of the first carbon-coated lithium manganese iron phosphate particles prepared in step 2 were mixed for 1 hr, transferred to a tube furnace and introduced with nitrogen gas, and then added with 0.1 g of glucose and calcined at 600° C. for 3 hrs to obtain a lithium iron phosphate cladded with a single layer of lithium manganese iron phosphate, that is, the first cladded body.

In step 4, the first cladded body and 74 g of the second carbon-coated lithium manganese iron phosphate particles were ball milled for 1 hr, transferred to a tube furnace and introduced with nitrogen gas, and then added with 0.2 g of glucose and calcined at 600° C. for 3 hrs to obtain a lithium iron phosphate cladded with double layers of lithium manganese iron phosphate, that is, the second cladded body.

In step 5, the second cladded body and 210 g of the third carbon-coated lithium manganese iron phosphate particles were ball milled for 3 hrs, transferred to a tube furnace and introduced with nitrogen gas, and then added with 1 g of glucose and calcined at 600° C. for 5 hrs to obtain a micron-sized lithium iron phosphate coated with three layers of lithium manganese iron phosphate. The micron-sized lithium iron phosphate coated with three layers of lithium manganese iron phosphate was then crushed and sieved to obtain a single-core multi-shell lithium manganese iron phosphate composite material having a uniform particle size.

Structural characteristics of the composite material were as follows:

Core: LFP particles each had a particle size between 534 nm and 686 nm and a carbon layer thickness between 3.2 nm and 3.6 nm;

Shell: LFMP particles each had a particle size between 120 nm and 190 nm, specifically, the first layer of LFMP particles had a particle size between 101 nm and 141 mm, a layer thickness between 913 nm and 1052 nm, and a carbon layer thickness between 3.4 nm and 4.1 nm;

the second layer of LFMP particles had a particle size between 161 nm and 182 mm, a layer thickness between 1891 nm and 2056 nm, and a carbon layer thickness between 3.5 nm and 4.3 nm; and the third layer of LFMP particles had a particle size between 208 nm and 238 mm, a layer thickness between 3882 nm and 4040 nm, and a carbon layer thickness between 3.7 nm and 4.5 nm.

Example 5

A single-core multi-shell lithium manganese iron phosphate composite material was prepared by the following steps:

In step 1, 1 g of lithium iron phosphate (LFP) was collected, placed in a tube furnace, and introduced with nitrogen gas, then added with 0.2 g of glucose, calcined at 750° C. for 5 hrs, and ball milled to obtain a carbon-coated lithium iron phosphate core.

In step 2, 700 g of lithium manganese iron phosphate (LFMP) was placed in a tube furnace and introduced with nitrogen gas, and then added with 60 g of glucose for mixing to yield a resulting mixture. Thereafter, 4 g of the resulting mixture was taken and calcined at 630° C. for 5 hrs to obtain a first carbon-coated lithium manganese iron phosphate particles; 12 g of the resulting mixture was taken and calcined at 650° C. for 5 hrs to obtain a second carbon-coated lithium manganese iron phosphate particles; 74 g of the resulting mixture was taken and calcined at 680° C. for 5 hrs to obtain a third carbon-coated lithium manganese iron phosphate particles; 210 g of the resulting mixture was taken and calcined at 700° C. for 5 hrs to obtain a fourth carbon-coated lithium manganese iron phosphate particles; and 400 g of the resulting mixture was taken and calcined at 700° C. for 5 hrs to obtain a fourth carbon-coated lithium manganese iron phosphate particles.

In step 3, the carbon-coated lithium iron phosphate core prepared in step 1 and 4 g of the first carbon-coated lithium manganese iron phosphate particles prepared in step 2 were mixed for 1 hr, transferred to a tube furnace and introduced with nitrogen gas, and then added with 0.1 g of glucose and calcined at 660° C. for 3 hrs to obtain a lithium iron phosphate cladded with a single layer of lithium manganese iron phosphate, that is, the first cladded body.

In step 4, the first cladded body and 12 g of the second carbon-coated lithium manganese iron phosphate particles were ball milled for 1 hr, transferred to a tube furnace and introduced with nitrogen gas, and then added with 0.2 g of glucose and calcined at 600° C. for 3 hrs to obtain a lithium iron phosphate cladded with double layers of lithium manganese iron phosphate, that is, the second cladded body.

In step 5, the second cladded body and 74 g of the third carbon-coated lithium manganese iron phosphate particles were ball milled for 3 hrs, transferred to a tube furnace and introduced with nitrogen gas, and then added with 1 g of glucose and calcined at 600° C. for 5 hrs to obtain a lithium iron phosphate coated with three layers of lithium manganese iron phosphate, that is, the third cladded body.

In step 6, the third cladded body and 210 g of the fourth carbon-coated lithium manganese iron phosphate particles were ball milled for 3 hrs, transferred to a tube furnace and introduced with nitrogen gas, and then added with 3 g of glucose and calcined at 600° C. for 5 hrs to obtain a micron-sized lithium iron phosphate coated with four layers of lithium manganese iron phosphate, that is, the fourth cladded body.

In step 7, the fourth cladded body and 400 g of the fifth carbon-coated lithium manganese iron phosphate particles were ball milled for 3 hrs, transferred to a tube furnace and introduced with nitrogen gas, and then added with 4 g of glucose and calcined at 600° C. for 5 hrs to obtain a micron-sized lithium iron phosphate coated with five layers of lithium manganese iron phosphate. The micron-sized lithium iron phosphate coated with five layers of lithium manganese iron phosphate was then crushed and sieved to obtain a single-core multi-shell lithium manganese iron phosphate composite material having a uniform particle size.

Structural characteristics of the composite material were as follows:

Core: LFP particles each had a particle size between 534 nm and 686 nm and a carbon layer thickness between 3.2 nm and 3.6 nm;

Shell: LFMP particles each had a particle size between 120 nm and 190 nm, specifically, the first layer of LFMP particles had a particle size between 101 nm and 141 mm, a layer thickness between 913 nm and 1052 nm, and a carbon layer thickness between 3.4 nm and 4.1 nm;

the second layer of LFMP particles had a particle size between 161 nm and 182 mm, a layer thickness between 1891 nm and 2056 nm, and a carbon layer thickness between 3.5 nm and 4.3 nm;

the third layer of LFMP particles had a particle size between 204 nm and 232 mm, a layer thickness between 2031 nm and 2153 nm, and a carbon layer thickness between 3.3 nm and 4.5 nm;

the fourth layer of LFMP particles had a particle size between 208 nm and 238 mm, a layer thickness between 3882 nm and 4040 nm, and a carbon layer thickness between 3.7 nm and 4.5 nm; and the fifth layer of LFMP particles had a particle size between 208 nm and 238 mm, a layer thickness between 7487 nm and 8132 nm, and a carbon layer thickness between 3.7 nm and 4.5 nm.

Example 6

A single-core multi-shell lithium manganese iron phosphate composite material was prepared by the following steps:

In step 1, 1 g of lithium iron phosphate (LFP) was collected, placed in a tube furnace, and introduced with nitrogen gas, then added with 0.2 g of glucose, calcined at 750° C. for 8 hrs, and ball milled to obtain a carbon-coated lithium iron phosphate core.

In step 2, 300 g of lithium manganese iron phosphate (LFMP) was placed in a tube furnace and introduced with nitrogen gas, and then added with 100 g of glucose for mixing to yield a resulting mixture. Thereafter, 4 g of the resulting mixture was taken and calcined at 630° C. for 8 hrs to obtain a first carbon-coated lithium manganese iron phosphate particles; 12 g of the resulting mixture was taken and calcined at 670° C. for 8 hrs to obtain a second carbon-coated lithium manganese iron phosphate particles; 74 g of the resulting mixture was taken and calcined at 700° C. for 8 hrs to obtain a third carbon-coated lithium manganese iron phosphate particles; and 210 g of the resulting mixture was taken and calcined at 750° C. for 5 hrs to obtain a fourth carbon-coated lithium manganese iron phosphate particles.

In step 3, the carbon-coated lithium iron phosphate core prepared in step 1 and 4 g of the first carbon-coated lithium manganese iron phosphate particles prepared in step 2 were mixed for 1 hr, transferred to a tube furnace and introduced with nitrogen gas, and then added with 0.2 g of glucose and calcined at 600° C. for 5 hrs to obtain a lithium iron phosphate cladded with a single layer of lithium manganese iron phosphate, that is, the first cladded body.

In step 4, the first cladded body and 12 g of the second carbon-coated lithium manganese iron phosphate particles were ball milled for 1 hr, transferred to a tube furnace and introduced with nitrogen gas, and then added with 0.3 g of glucose and calcined at 600° C. for 5 hrs to obtain a lithium iron phosphate cladded with double layers of lithium manganese iron phosphate, that is, the second cladded body.

In step 5, the second cladded body and 74 g of the third carbon-coated lithium manganese iron phosphate particles were ball milled for 3 hrs, transferred to a tube furnace and introduced with nitrogen gas, and then added with 2 g of glucose and calcined at 600° C. for 5 hrs to obtain a lithium iron phosphate coated with three layers of lithium manganese iron phosphate, that is, the third cladded body.

In step 6, the third cladded body and 210 g of the fourth carbon-coated lithium manganese iron phosphate particles were ball milled for 3 hrs, transferred to a tube furnace and introduced with nitrogen gas, and then added with 4 g of glucose and calcined at 600° C. for 5 hrs to obtain a micron-sized lithium iron phosphate coated with four layers of lithium manganese iron phosphate. The micron-sized lithium iron phosphate coated with four layers of lithium manganese iron phosphate was then crushed and sieved to obtain a single-core multi-shell lithium manganese iron phosphate composite material having a uniform particle size.

Structural characteristics of the composite material were as follows:

Core: LFP particles each had a particle size between 534 nm and 686 nm and a carbon layer thickness between 3.2 nm and 3.6 nm;

Shell: LFMP particles each had a particle size between 120 nm and 190 nm, specifically, the first layer of LFMP particles had a particle size between 52 nm and 78 mm, a layer thickness between 425 nm and 511 nm, and a carbon layer thickness between 8.2 nm and 12.3 nm;

the second layer of LFMP particles had a particle size between 101 nm and 141 mm, a layer thickness between 913 nm and 1052 nm, and a carbon layer thickness between 8.2 nm and 12.3 nm;

the third layer of LFMP particles had a particle size between 161 nm and 182 mm, a layer thickness between 1891 nm and 2056 nm, and a carbon layer thickness between 8.2 nm and 12.3 nm; and the fourth layer of LFMP particles had a particle size between 208 nm and 238 mm, a layer thickness between 3882 nm and 4040 nm, and a carbon layer thickness between 8.2 nm and 12.3 nm.

Comparative Example 1

A single-core multi-shell lithium manganese iron phosphate composite material was prepared by the following steps:

In step 1, 1 g of lithium iron phosphate (LFP) was collected, placed in a tube furnace, and introduced with nitrogen gas, then added with 0.2 g of glucose, calcined at 750° C. for 8 hrs, and ball milled to obtain a carbon-coated lithium iron phosphate core.

In step 2, 300 g of lithium manganese iron phosphate (LFMP) was placed in a tube furnace and introduced with nitrogen gas. Thereafter, 4 g of a resulting LFMP was taken and calcined at 630° C. for 8 hrs to obtain a first carbon-coated lithium manganese iron phosphate particles; 12 g of the resulting LFMP was taken and calcined at 670° C. for 8 hrs to obtain a second carbon-coated lithium manganese iron phosphate particles; 74 g of the resulting LFMP was taken and calcined at 700° C. for 8 hrs to obtain a third carbon-coated lithium manganese iron phosphate particles; and 210 g of the resulting LFMP was taken and calcined at 750° C. for 5 hrs to obtain a fourth carbon-coated lithium manganese iron phosphate particles.

In step 3, the carbon-coated lithium iron phosphate core prepared in step 1 and 4 g of the first carbon-coated lithium manganese iron phosphate particles prepared in step 2 were mixed for 1 hr, transferred to a tube furnace and introduced with nitrogen gas, and then calcined at 600° C. for 5 hrs to obtain a lithium iron phosphate cladded with a single layer of lithium manganese iron phosphate, that is, the first cladded body.

In step 4, the first cladded body and 12 g of the second carbon-coated lithium manganese iron phosphate particles were ball milled for 1 hr, transferred to a tube furnace and introduced with nitrogen gas, and then calcined at 600° C. for 5 hrs to obtain a lithium iron phosphate cladded with double layers of lithium manganese iron phosphate, that is, the second cladded body.

In step 5, the second cladded body and 74 g of the third carbon-coated lithium manganese iron phosphate particles were ball milled for 3 hrs, transferred to a tube furnace and introduced with nitrogen gas, and then calcined at 600° C. for 5 hrs to obtain a lithium iron phosphate coated with three layers of lithium manganese iron phosphate, that is, the third cladded body.

In step 6, the third cladded body and 210 g of the fourth carbon-coated lithium manganese iron phosphate particles were ball milled for 3 hrs, transferred to a tube furnace and introduced with nitrogen gas, and then calcined at 600° C. for 5 hrs to obtain a micron-sized lithium iron phosphate coated with four layers of lithium manganese iron phosphate. The micron-sized lithium iron phosphate coated with four layers of lithium manganese iron phosphate was then crushed and sieved to obtain a single-core multi-shell lithium manganese iron phosphate composite material having a uniform particle size.

Structural characteristics of the composite material were as follows:

Core: LFP particles each had a particle size between 534 nm and 686 nm;

Shell: LFMP particles each had a particle size between 120 nm and 190 nm, specifically, the first layer of LFMP particles had a particle size between 101 nm and 141 mm, and a layer thickness between 913 nm and 1052 nm;

the second layer of LFMP particles had a particle size between 161 nm and 182 mm, and a layer thickness between 1891 nm and 2056 nm;

the third layer of LFMP particles had a particle size between 204 nm and 232 mm, and a layer thickness between 2031 nm and 2153 nm; and the fourth layer of LFMP particles had a particle size between 208 nm and 238 mm, and a layer thickness between 3882 nm and 4040 nm.

In order to verify the progress of embodiments of the present application, the powder pressure test and electrical properties test were respectively carried out on the LFMP finished products prepared in Examples 1-6 and Comparative Example 1:

1. Powder pressure test: By weighing 1 g of each of the LFMP finished products, the compaction density of the test at a pressure of 10 MPa (through a 3T pressure sensor) is shown in Table 1.

TABLE 1

| Test items<br>Test objects | Compaction density g/cm$^3$ |
|---|---|
| Example 1 | 2.386 |
| Example 2 | 2.453 |

TABLE 1-continued

| Test items<br>Test objects | Compaction density g/cm$^3$ |
|---|---|
| Example 3 | 2.412 |
| Example 4 | 2.363 |
| Example 5 | 2.451 |
| Example 6 | 2.361 |
| Comparative Example 1 | 2.231 |

2. Battery performance test: Using the cathode material particles provided in the above examples and comparative example, the battery was assembled as follows:

Preparation of the cathode plate: LFMP, conductive carbon black (SP), polyvinylidene fluoride (PVDF), and N-methylpyrrolidone (NMP) were mixed evenly with a ball mill mixer for 2 hrs at a mass ratio of 93.5:2.5:4:100 to obtain cathode slurry; the prepared cathode slurry was applied onto an aluminum foil, evenly scraped with a scraper, dried at 130° C., and then rolled, so as to obtain the cathode plate.

Battery assembly process: the prepared cathode was attached to a cathode metal shell via a conductive adhesive, a metal lithium sheet was used as an anode, a Celgard 2400 microporous membrane was used as a separator, and 1.0 mol/L $LiPF_6$ solution was adopted as an electrolyte. A solvent of the electrolyte is a mixture of ethylene carbonate (EC), diethyl carbonate (DEC), and ethyl methyl carbonate (EMC) with a volume ratio of 1:1:1, and a button cell was assembled in a glove box.

The electrochemical properties of the above-mentioned button cell were tested with a LAND electrochemical tester, and the charge termination voltage was 4.2 V, and the discharge termination voltage was 2.0 V. The test results were shown in Table 2 below.

TABLE 2

| | Test Items | | | |
|---|---|---|---|---|
| Test Objects | 0.1 C Discharge mAh · g −1 (25 °C) | 0.1 C Specific energy wh/kg (25 °C) | 1 C Specific energy wh/kg (25 °C) | Resistivity (Ω · cm) |
| Example 1 | 155.3 | 581.3 | 543.6 | 5.3 |
| Example 2 | 153.5 | 568.6 | 518.3 | 6.4 |
| Example 3 | 154.8 | 578.4 | 536.2 | 3.9 |
| Example 4 | 149.3 | 552.3 | 493.6 | 4.3 |
| Example 5 | 140.3 | 526.2 | 462.3 | 5.3 |
| Example 6 | 153.1 | 565.4 | 521.2 | 1.4 |
| Comparative Example 1 | 89.3 | 334.1 | 287.3 | 13652 |

From the above test results, it can be seen that the single-core multi-shell lithium manganese iron phosphate composite material prepared in the examples of the present application has excellent electrochemical properties, including electrical conductivity, energy density, and compaction density, especially the single-core multi-shell manganese iron phosphate composite material prepared in Examples 1-3 exhibits more excellent electrochemical properties due to the particle size of the material. When the number of the cladding layers reduces (Example 4), the number of cladding layers increases (Example 5), and the thickness of the carbon coating layers increases (Example 6), the electrochemical properties of the composite material will be reduced to a certain extent. When the thickness of the cladding layers is the same, too thick the inner layer of particles may result in that the electrical properties cannot be released; therefore, the thickness of the cladding layers increases from inside to outside. When the number of cladding layers is greater than four, the cladded particle is too large in such condition, and the electrical properties released by the particles inside the material are reduced due to the longer conduction distance. In contrast, when the cladding layer is lower than four layers, the compaction density is low because the cladding particles are too small. However, when no carbon material was added in the preparation process of Comparative Example 1, and no carbon coating layer was formed on the surface of lithium iron phosphate and lithium manganese iron phosphate, the electrochemical properties of the composite material such as electrical conductivity, energy density, and compaction density were significantly reduced.

The above are only optional embodiments of the present application, and are not intended to limit the application. For those skilled in the art, the present application may have various modifications and changes. Any modifications, equivalent replacements, improvements, and the like made within the spirits and principles of the present application shall be included within the scope of the claims of the present application.

What is claimed is:

1. A single-core multi-shell lithium manganese iron phosphate composite material, comprising:

a carbon-coated lithium iron phosphate core, and a plurality of lithium manganese iron phosphate cladding layers cladded on an outer surface of the carbon-coated lithium iron phosphate core, each of the plurality of lithium manganese iron phosphate cladding layers comprising: lithium manganese iron phosphate particles, and a carbon material coated on the lithium manganese iron phosphate particles;

wherein the lithium manganese iron phosphate particles in the plurality of the lithium manganese iron phosphate cladding layers have particle sizes increasing in a radial direction from an inside to an outside of the single-core multi-shell lithium manganese iron phosphate composite material.

2. The single-core multi-shell lithium manganese iron phosphate composite material according to claim 1, wherein in the carbon-coated lithium iron phosphate core comprises a plurality of lithium iron phosphate particles, wherein a particle size of each of the lithium iron phosphate particles is between 500 nm and 900 nm, and a thickness of a carbon coating layer is between 3 nm and 5 nm.

3. The single-core multi-shell lithium manganese iron phosphate composite material according to claim 1, wherein in the plurality of lithium manganese iron phosphate cladding layers, the particle size of each of the lithium manganese iron phosphate particles is between 50 nm and 300 nm, and a coating thickness of the carbon material is between 3 nm and 10 nm.

4. The single-core multi-shell lithium manganese iron phosphate composite material according to claim 1, wherein a mass ratio of lithium iron phosphate particles to the lithium manganese iron phosphate particles is (1 to 50):(300 to 500).

5. The single-core multi-shell lithium manganese iron phosphate composite material according to claim 1, wherein a mass ratio of lithium iron phosphate particles to the lithium manganese iron phosphate particles is 1:(300 to 500).

6. The single-core multi-shell lithium manganese iron phosphate composite material according to claim 1, wherein a total thickness of the plurality of lithium manganese iron phosphate cladding layers is between 6.4 μm and 7.5 μm.

7. The single-core multi-shell lithium manganese iron phosphate composite material according to claim 4, wherein the single-core multi-shell lithium manganese iron phosphate composite material comprises four lithium manganese iron phosphate cladding layers, which, in the radial direction from the inside to the outside of the single-core multi-shell lithium manganese iron phosphate composite material, are respectively a first lithium manganese iron phosphate cladding layer, a second lithium manganese iron phosphate cladding layer, a third lithium manganese iron phosphate cladding layer, and a fourth lithium manganese iron phosphate cladding layer;

wherein, a mass ratio of the lithium manganese iron phosphate particles in the first lithium manganese iron phosphate cladding layer, the second lithium manganese iron phosphate cladding layer, the third lithium manganese iron phosphate cladding layer, and the fourth lithium manganese iron phosphate cladding layer is (3 to 5):(9 to 12):(60 to 80):(250 to 350).

8. The single-core multi-shell lithium manganese iron phosphate composite material according to claim 7, wherein the first lithium manganese iron phosphate cladding layer has a thickness between 400 nm and 600 nm, and the lithium manganese iron phosphate particles in the first lithium manganese iron phosphate cladding layer have particle sizes between 50 nm and 150 nm.

9. The single-core multi-shell lithium manganese iron phosphate composite material according to claim 7, wherein the second lithium manganese iron phosphate cladding layer has a thickness between 900 nm and 1000 nm, and the lithium manganese iron phosphate particles in the second lithium manganese iron phosphate cladding layer have particle sizes between 100 nm and 200 nm.

10. The single-core multi-shell lithium manganese iron phosphate composite material according to claim 7, wherein the third lithium manganese iron phosphate cladding layer has a thickness between 1900 nm and 2000 nm, and the lithium manganese iron phosphate particles in the third lithium manganese iron phosphate cladding layer have particle sizes between 150 nm and 250 nm.

11. The single-core multi-shell lithium manganese iron phosphate composite material according to claim 7, wherein the fourth lithium manganese iron phosphate cladding layer has a thickness between 3900 nm and 4000 nm, and the lithium manganese iron phosphate particles in the fourth lithium manganese iron phosphate cladding layer have particle sizes between 200 nm and 300 nm.

12. A preparation method for preparing a single-core multi-shell lithium manganese iron phosphate composite material, the preparation method comprising the following steps:

preparing carbon-coated lithium iron phosphate particles;

preparing carbon-coated lithium manganese iron phosphate particles having different particle sizes; and forming the carbon-coated lithium iron phosphate particles into a carbon-coated lithium iron phosphate core, sequentially preparing a plurality of lithium manganese iron phosphate cladding layers on an outer surface of the carbon-coated lithium iron phosphate core, according to an order of particle sizes of the carbon-coated lithium manganese iron phosphate particles sequentially increasing, thereby obtaining the single-core multi-shell lithium manganese iron phosphate composite material.

13. The preparation method for preparing a single-core multi-shell lithium manganese iron phosphate composite material according to claim 12, wherein the step of preparing carbon-coated lithium iron phosphate particles comprises:

combining lithium iron phosphate with a first carbon source, and performing a first sintering treatment to obtain the carbon-coated lithium iron phosphate particles.

14. The preparation method for preparing a single-core multi-shell lithium manganese iron phosphate composite material according to claim 13, wherein the step of preparing carbon-coated lithium manganese iron phosphate particles having different particle sizes comprises:

mixing lithium manganese iron phosphate with a second carbon source, and performing a second sintering treatment to obtain first carbon-coated lithium manganese iron phosphate particles;

mixing lithium manganese iron phosphate with a third carbon source, and performing a third sintering treatment to obtain second carbon-coated lithium manganese iron phosphate particles;

mixing lithium manganese iron phosphate with a fourth carbon source, and performing a fourth sintering treatment to obtain third carbon-coated lithium manganese iron phosphate particles; and mixing lithium manganese iron phosphate with a fifth carbon source, and performing a fifth sintering treatment to obtain fourth carbon-coated lithium manganese iron phosphate particles;

wherein temperatures of the second sintering treatment, the third sintering treatment, the fourth sintering treatment, and the fifth sintering treatment sequentially increase and are between 630° C. and 800° C.

15. The preparation method for preparing a single-core multi-shell lithium manganese iron phosphate composite material according to claim 14, wherein conditions for the first sintering treatment comprise: sintering in an inert atmosphere at a temperature of between 750° C. and 800° C. for 5 hrs to 8 hrs;

conditions for the second sintering treatment comprise: sintering in an inert atmosphere at a temperature of between 630° C. and 650° C. for 5 hrs to 8 hrs;

conditions for the third sintering treatment comprise: sintering in an inert atmosphere at a temperature of between 650° C. and 680° C. for 5 hrs to 8 hrs;

conditions for the fourth sintering treatment comprise: sintering in an inert atmosphere at a temperature of between 700° C. and 730° C. for 5 hrs to 8 hrs; and conditions for the fifth sintering treatment comprise: sintering in an inert atmosphere at a temperature of between 750° C. and 800° C. for 5 hrs to 8 hrs.

16. The preparation method for preparing a single-core multi-shell lithium manganese iron phosphate composite material according to claim 14, wherein each of the first carbon source, the second carbon source, the third carbon source, the fourth carbon source, and the fifth carbon source is independently at least one selected from sucrose, glucose, oxalic acid, salicylic acid, citric acid, tartaric acid, malic acid, glycine, ethylenediaminetetraacetic acid, and succinic acid.

17. The preparation method for preparing a single-core multi-shell lithium manganese iron phosphate composite material according to claim 16, wherein the step of sequentially preparing a plurality of lithium manganese iron phosphate cladding layers on an outer surface of the carbon-coated lithium iron phosphate core comprises:

cladding the first carbon-coated lithium manganese iron phosphate particles on a surface of the carbon-coated lithium iron phosphate core, performing a sixth sintering treatment in the presence of a sixth carbon source to form a first lithium manganese iron phosphate cladding layer, thereby obtaining a first cladded body;

cladding the second carbon-coated lithium manganese iron phosphate particles on a surface of the first cladded body, performing a seventh sintering treatment in the presence of a seventh carbon source to form a second lithium manganese iron phosphate cladding layer, thereby obtaining a second cladded body;

cladding the third carbon-coated lithium manganese iron phosphate particles on a surface of the second cladded body, performing an eighth sintering treatment in the presence of a eighth carbon source to form a third lithium manganese iron phosphate cladding layer, thereby obtaining a third cladded body; and cladding the fourth carbon-coated lithium manganese iron phosphate particles on a surface of the third cladded body, performing a ninth sintering treatment in the presence of a ninth carbon source to form a fourth lithium manganese iron phosphate cladding layer, thereby obtaining a fourth cladded body.

18. The preparation method for preparing a single-core multi-shell lithium manganese iron phosphate composite material according to claim 17, wherein in the single-core multi-shell lithium manganese iron phosphate composite material, a mass ratio of the first carbon-coated lithium manganese iron phosphate particles, the second carbon-coated lithium manganese iron phosphate particles, the third carbon-coated lithium manganese iron phosphate particles, the fourth carbon-coated lithium manganese iron phosphate particles is (3 to 5):(9 to 12):(60 to 80):(250 to 350); and/or, each of the sixth carbon source, the seventh carbon source, the eighth carbon source, and the ninth carbon source is independently at least one selected from sucrose, glucose, oxalic acid, salicylic acid, citric acid, tartaric acid, malic acid, glycine, ethylenediaminetetraacetic acid, and succinic acid.

19. The preparation method for preparing a single-core multi-shell lithium manganese iron phosphate composite material according to claim 18, wherein conditions for each of the sixth sintering treatment, the seventh sintering treatment, the eighth sintering treatment, and the ninth sintering treatment independently comprise: sintering in an inert atmosphere at a temperature between 600° C. and 650° C. for 2 hrs to 5 hrs.

20. A secondary battery, comprising a cathode material, the cathode material comprising:

the single-core multi-shell lithium manganese iron phosphate composite material according to claim 1.

* * * * *